C. S. SHEPARD.
RECEPTACLE FOR FEEDING AND WATERING POULTRY.
APPLICATION FILED SEPT. 2, 1920.

1,384,785.

Patented July 19, 1921.

INVENTOR:
Charles S. Shepard,
BY
ATTORNEYS.

UNITED STATES PATENT OFFICE.

CHARLES S. SHEPARD, OF CATTARAUGUS, NEW YORK; MINERVA A. SHEPARD EXECUTRIX OF SAID CHARLES S. SHEPARD, DECEASED.

RECEPTACLE FOR FEEDING AND WATERING POULTRY.

1,384,785.  Specification of Letters Patent.  Patented July 19, 1921.

Application filed September 2, 1920. Serial No. 407,787.

*To all whom it may concern:*

Be it known that I, CHARLES S. SHEPARD, a citizen of the United States, residing at Cattaraugus, in the county of Cattaraugus and State of New York, have invented or discovered certain new and useful Improvements in Receptacles for Feeding and Watering Poultry, of which the following is a specification, reference being had therein to the accompanying drawing.

This invention relates to a device or receptacle for containing water or feed, or both, for poultry, and has for its object to provide a receptacle of simple construction and in the use of which the contents of the receptacle will be guarded against pollution by the poultry, the receptacle being so constructed that certain parts thereof may be removed to enable the device to be conveniently packed in shipping, these removable parts being interchangeable so that should any of them become broken or lost they may be replaced by other similar parts, all as will hereinafter more fully appear.

Figure 1:
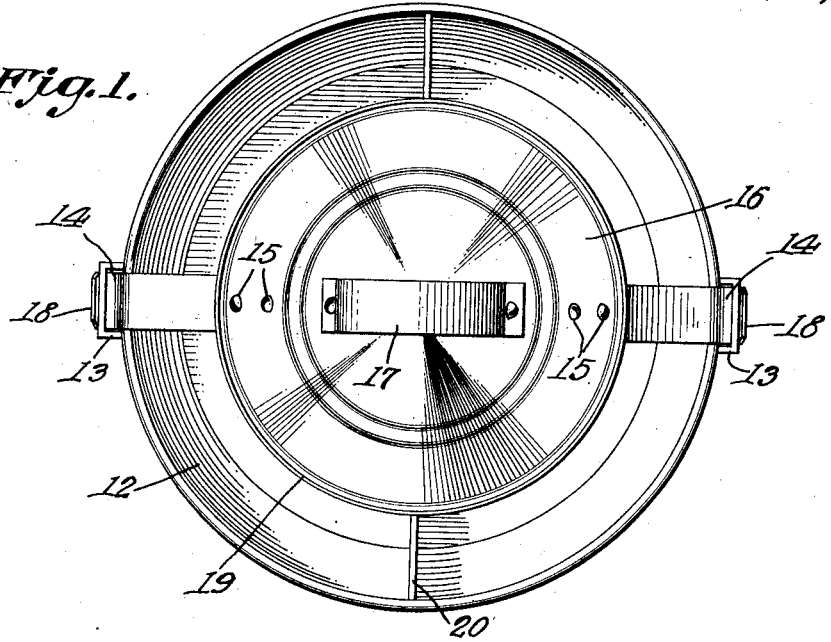
Figure 2:
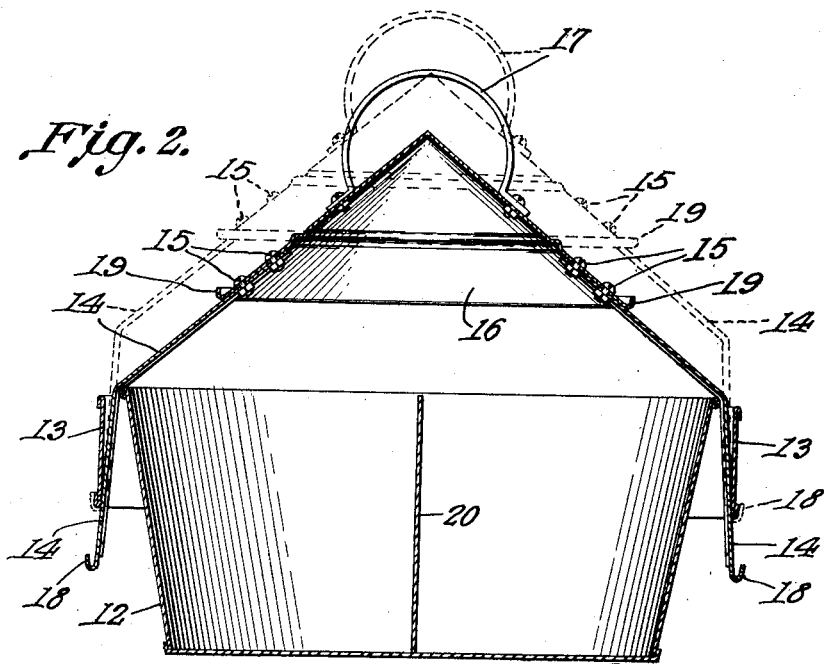

In the accompanying drawing Figure 1 is a plan view of the improved receptacle, and Fig. 2 is a vertical section of the same.

Referring to the drawing, 12 denotes the body portion of the receptacle consisting of an open-topped pan provided at its opposite sides with brackets 13 which are open from top to bottom, and which loosely receive spring arms 14 removably attached, by means of bolts 15, to the conical cover or guard 16, which is preferably of a diameter about two-thirds that of the top of the pan 12. The spring arms 14 are bent in such a manner as to frictionally engage the outer portions of the brackets 13 so that the guard 16 will be supported in different vertical positions to which it may be adjusted so that it may be located at different heights above the top of the pan 12, as may be desired. That is to say, the guard 16 will be maintained in either of the two positions shown in full and dotted lines in Fig. 2, or in any intermediate position to which it may be adjusted.

The guard 16 is provided with a handle 17 which also may be removably attached to the said guard by bolts 15, if desired. The arms 14 are provided at their lower ends with hooks 18 which, when the receptacle is to be carried by the handle 17, will engage the lower outer portions of the brackets 13 so that the device may be readily carried by the said handle, as will be understood.

The conical guard 16 is provided at its lower edge with a turned-up flange 19 which affords a small trough at the lower end of said guard which will check the downward movement into the receptacle of any dust or dirt which may be lodged on the guard. The rounded lower edge of the guard, afforded by the turned-up flange 19, affords a smooth surface which will not injure the combs of the fowls when they are eating or drinking.

As hereinbefore stated the receptacle is adapted to contain water or feed for poultry, and if desired may be provided with a partition 20 so that it may contain both water and grain, or other feed, at the same time.

From the foregoing it will be understood that the invention provides a simple and convenient device adapted to contain water or feed for poultry, or both water and feed, if desired, this receptacle being fully open at both sides between the arms 14 so that free access to the contents of the receptacle by the poultry is afforded. It will be understood that the guard 16 will prevent the poultry from soiling the contents of the receptacle so that said contents will always be in a clean and sanitary condition. The parts of the receptacle will preferably all be made of galvanized sheet iron, but may, if desired, be of any other suitable material.

Having thus described my invention I claim and desire to secure by Letters Patent:

1. A receptacle, for the purpose indicated, consisting of an open topped pan provided at its outer sides with brackets open from top to bottom, a guard provided with spring arms passing downward through the said brackets and by means of which the said guard may be supported in different positions of adjustment by frictional contact of the said spring arms with the outer portions of said brackets.

2. A receptacle, for the purpose indicated, consisting of an open topped pan provided at its outer sides with brackets open from top to bottom, a guard provided with spring arms passing downward through the said brackets and by means of which the said guard may be supported in different positions of adjustment by frictional contact of the said spring arms with the outer portions of said brackets, said spring arms being provided at their lower ends with hooks for engagement with the said outer portions of said brackets, and said guard being provided with a handle by which the receptacle may be conveniently carried.

In testimony whereof I affix my signature.

CHARLES S. SHEPARD.